No. 663,702. Patented Dec. 11, 1900.
F. R. PARKER.
SPRING FRAME FOR VEHICLES.
(Application filed Feb. 6, 1900.)
(No Model.)
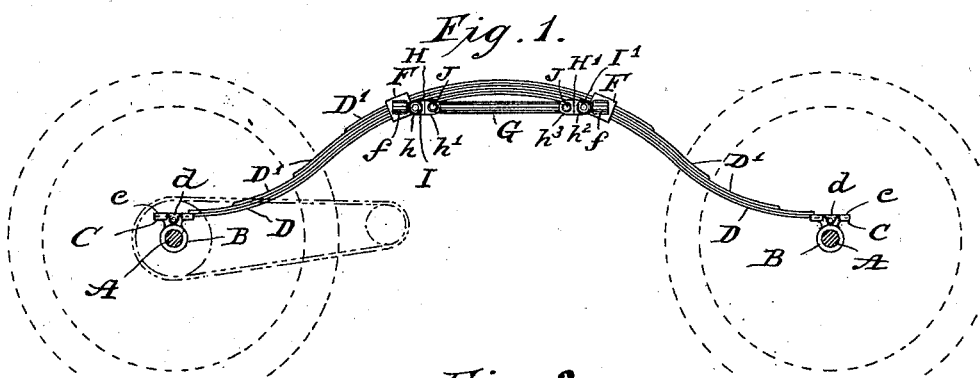
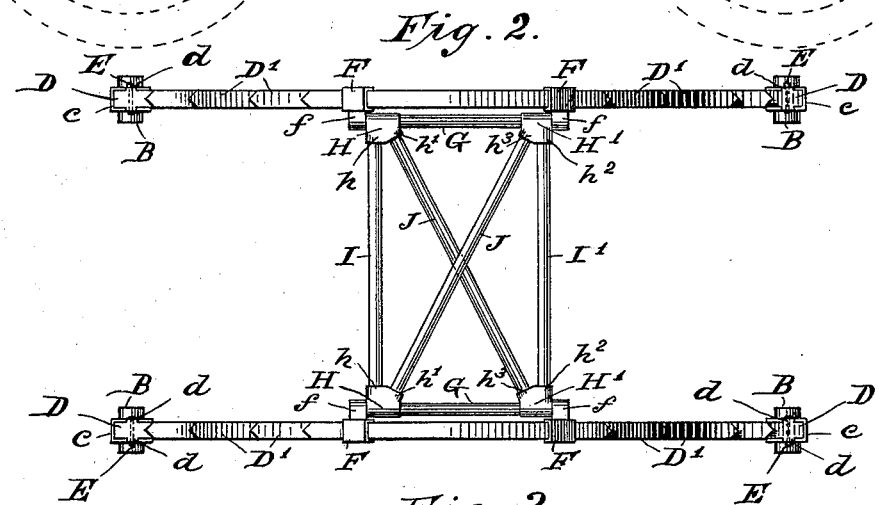
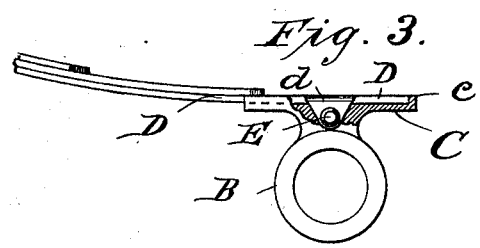
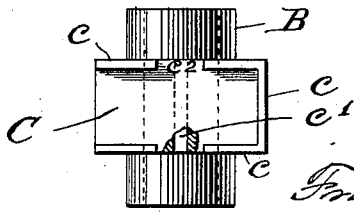
Witnesses
Inventor
Frank R. Parker.
By his Attorney

UNITED STATES PATENT OFFICE.

FRANK R. PARKER, OF PENACOOK, NEW HAMPSHIRE.

SPRING-FRAME FOR VEHICLES.

SPECIFICATION forming part of Letters Patent No. 663,702, dated December 11, 1900.

Application filed February 6, 1900. Serial No. 4,199. (No model.)

*To all whom it may concern:*

Be it known that I, FRANK R. PARKER, a citizen of the United States, residing at Penacook, in the county of Merrimac and State of New Hampshire, have invented a certain new and useful Improved Spring-Frame for Vehicles; and I do hereby declare the following to be a full, clear, and exact description of the invention, such as will enable others skilled in the art to which it appertains to make and use the same.

The object of this invention is to simplify and at the same time cheapen the construction of spring vehicle-frames.

The invention consists, essentially, in forming the longitudinal axle connections of spring material, which, with other novel features, will be fully set forth in the following specification and claims, and clearly illustrated in the drawings forming a part of the same, of which—

Figure 1 is a sectional elevation showing one of my improved frames as when adapted for an automobile, the wheels and driving-gear being represented by dotted lines. Fig. 2 is a plan view of my improved frame. Fig. 3 is a broken elevation of one of my improved axle bearings or couplings by which an axle may be connected to the spring members of my improved frame, Fig. 4 being a plan view of an axle bearing or coupling in detail.

Similar reference-letters denote corresponding parts.

A represents the axle of an automobile, and B bearings for said axles, said bearings being provided upon their top with an integral plate C, which is formed longer than it is wide and having its length in a direction transverse to that of the said bearing. The plate C is provided upon three of its edges with an upturned flange $c$, the space within said flange being adapted to form a seat or socket for either end of the longitudinal side spring members D, said spring members of the frame being the only portion of my improved frame connecting the forward with the rear axle of the vehicle. The said springs are provided near each end with downward-projecting ears $d$, disposed at opposite points one to the other, and are perforated for the reception of a retaining-bolt. Said ears extend laterally through openings $c^2$, formed for the purpose in the side flanges $c$ of the plate C, and then downward on opposite sides of said plate, so that their perforation shall register with a perforation $c'$, formed transversely through the plate C, as shown best in Fig. 4.

A bolt E passes through the ears $d$ and perforation $c'$, thus securing the ends of the springs D firmly within the seat or socket upon the plate C. The springs D may be supplemented by as many layers D' as may be deemed advisable for various vehicles, according to the number of occupants or the weight they are designed to carry. As has been shown, these springs D form the side members of my improved frame and are connected by a suitable transverse frame capable of supporting the vehicle-body and its motor and located midway from the ends of said springs. It is desirable that this transverse frame should hold said side spring members rigid, as far as any lateral motion is concerned, but yielding with respect to their vertical motion, and hence I show clamp or strap irons F, secured to and at equal distances from the ends of said spring side members, composed of the parts D D', and upon these irons F are formed or attached socket projections $f$, into which are brazed or otherwise rigidly secured the ends of a bar or tube G, connecting the irons F of each spring side member. Upon these bars or tubes G are mounted a pair of unions H H', one being located close to each socket $f$. The unions H H' are provided each with two sockets $h$ $h'$.

A bar or tube I extends transversely between the spring side members D and is rigidly secured within the socket $h$ of the opposite unions H, and a bar or tube I' is similarly attached to socket $h^2$ of the opposite union H', while bars or tubes J extend at an angle between the spring side members, crossing each other midway from their ends, said ends being rigidly secured one to a socket $h'$ of either union H and the other to a socket $h^3$ of either union H', thus forming a horizontal truss connection between said spring side members which prevents their lateral movement and constitutes a suitable support for the vehicle-body, as well as its motor and driving mechanism, and by placing the driving gear or sprocket on a plane (or thereabout) with the driving-axle of said vehicle, as seen by dotted lines in Fig. 1, the driving belt or chain will retain its normal tension, whether the vehicle is loaded or not, to wit: The distance between the axles increases substantially in proportion with the depression of the spring side members. Thus any slack which would otherwise result in the driving-chain is automatically taken up by the settling of the vehicle under its load.

Having described my invention, what I claim is—

1. A yielding frame for automobiles consisting of, wheel-axles, a pair of sleeves loosely mounted upon each axle, a pair of longitudinally-disposed springs having their ends rigidly secured to said sleeves, and a transverse frame connecting the central portions of said springs for supporting the body of the automobile.

2. A yielding frame for automobiles consisting of, wheel-axles, a pair of sleeves loosely mounted upon said axles, a pair of longitudinally-disposed springs having their ends rigidly secured to said sleeves, and a transverse trussed frame pivotally connected to the central portions of said springs for supporting the body of the automobile.

3. A spring-frame for automobiles in which longitudinal side springs form the direct and only connection between the axles, means whereby said axles may revolve within the couplings for said springs, said means consisting of sleeves loosely mounted upon said axles and provided with flanged plates to which an end of either spring may be fitted and firmly secured.

4. In a motor-vehicle, means for automatically taking up the slack in the driving-chain, said means comprising a spring-frame upon which the driving mechanism and the axles are mounted, whereby said axles spread apart when the carriage is loaded thus lowering the crank-shaft of the motor in accordance with the outward movement of the driving-axle and load of said vehicle.

5. A spring-frame for automobiles in which longitudinal side springs form the direct and only connection between the axles, means for loosely coupling the springs to the axles, said means comprising a pair of perforated ears at the ends of each spring, sleeves loosely fitting said axles, each sleeve being provided with a horizontally-disposed flanged plate, a slot formed in the opposite flanges of said plate for the reception of the ears of the springs, and a bolt passing through the ears and coupling, substantially for the purpose set forth.

6. In a yielding frame for automobiles, means whereby the distance between the axles increases with the increased load thus avoiding any slack in the driving-chain, said means consisting of a pair of axles, a pair of longitudinal springs having their ends rigidly connected each to one of a pair of sleeves loosely mounted upon either axle, and a transverse trussed frame supporting the motor and body of the vehicle and pivotally attached to the central portions of said springs in a manner to maintain said springs in a parallel position.

In testimony whereof I affix my signature in presence of two witnesses.

FRANK R. PARKER.

Witnesses:
J. B. THURSTON,
EMILE H. TARDIVEL.